(12) United States Patent
Wootton et al.

(10) Patent No.: US 11,018,510 B2
(45) Date of Patent: *May 25, 2021

(54) CONFIGURABLE MESH NETWORK FOR AN ELECTRICAL SWITCHING SYSTEM

(71) Applicant: Ivani, LLC, Dardenne Praire, MO (US)

(72) Inventors: Matthew Wootton, St. Louis, MO (US); Christopher Nissman, Tucson, AZ (US); John Wootton, St. Louis, MO (US); Justin McKinney, Wildwood, MO (US)

(73) Assignee: Ivani, LLC, Dardenne Prairie, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/538,196

(22) Filed: Aug. 12, 2019

(65) Prior Publication Data

US 2019/0363544 A1    Nov. 28, 2019

Related U.S. Application Data

(63) Continuation of application No. 15/808,410, filed on Nov. 9, 2017, now Pat. No. 10,418,824, which is a
(Continued)

(51) Int. Cl.
*H02J 4/00* (2006.01)
*H04L 12/24* (2006.01)
(Continued)

(52) U.S. Cl.
CPC ............... *H02J 4/00* (2013.01); *H02J 13/00* (2013.01); *H04L 41/0631* (2013.01); *H05B 47/19* (2020.01)

(58) Field of Classification Search
CPC ........................................................ H02J 4/00
See application file for complete search history.

(56) References Cited

U.S. PATENT DOCUMENTS

| 5,563,455 | A | 10/1996 | Cheng |
| 7,663,325 | B2 | 2/2010 | McDonough et al. |

(Continued)

FOREIGN PATENT DOCUMENTS

| CN | 1909755 A | 2/2007 |
| CN | 101184353 Y | 5/2008 |

(Continued)

OTHER PUBLICATIONS

China National Intellectual Property Administration's Office Action and Search Report, PRC Patent Application No. 201580059998.5, dated Jun. 15, 2020 (9 pages).
(Continued)

*Primary Examiner* — Hai L Nguyen
(74) *Attorney, Agent, or Firm* — Lewis Rice LLC

(57) ABSTRACT

Systems and methods that can be retrofitted into an existing wired electrical system replacing existing switches whether as a standalone single switch or part of a multi-way switch configuration that can be controlled locally nominally by touch, controlled remotely by a remote, or controlled remotely by a computer. The systems and method provide that the switches establish a local network allowing for retrofit or construction of a structure or facility with electrical system automation without the need for additional wiring.

20 Claims, 5 Drawing Sheets

Related U.S. Application Data continuation of application No. 14/698,690, filed on Apr. 28, 2015, now Pat. No. 9,843,194, which is a continuation-in-part of application No. 14/606,881, filed on Jan. 27, 2015, now Pat. No. 9,692,236.

(60) Provisional application No. 62/074,902, filed on Nov. 4, 2014, provisional application No. 61/932,085, filed on Jan. 27, 2014.

(51) Int. Cl.
*H02J 13/00* (2006.01)
*H05B 47/19* (2020.01)

(56) References Cited

U.S. PATENT DOCUMENTS

| | | | |
|---|---|---|---|
| 8,269,376 | B1 | 9/2012 | Elberbaum |
| 8,531,134 | B2 | 9/2013 | Chemel et al. |
| 8,536,998 | B1 | 9/2013 | Siu et al. |
| 8,552,664 | B2 | 10/2013 | Chemel et al. |
| 8,593,264 | B2 | 11/2013 | Umezawa et al. |
| 8,766,556 | B2 | 7/2014 | Meyer |
| 10,418,824 | B2 * | 9/2019 | Wootton ............ H04L 41/0631 |
| 2004/0196140 | A1 | 10/2004 | Sid |
| 2006/0161270 | A1 * | 7/2006 | Luskin ................. H04L 12/282 700/22 |
| 2009/0256483 | A1 | 10/2009 | Gehman et al. |
| 2010/0145545 | A1 | 6/2010 | Mosebrook et al. |
| 2011/0141647 | A1 | 6/2011 | Garcia et al. |
| 2011/0182012 | A1 | 7/2011 | Hilton et al. |
| 2012/0207484 | A1 | 8/2012 | Elberbaum |
| 2014/0097758 | A1 | 4/2014 | Recker et al. |
| 2014/0117871 | A1 | 5/2014 | Swatsky et al. |
| 2014/0265881 | A1 | 9/2014 | Karc et al. |
| 2015/0005900 | A1 | 1/2015 | Steele et al. |

FOREIGN PATENT DOCUMENTS

| | | |
|---|---|---|
| CN | 201319687 Y | 9/2009 |
| CN | 201467534 U | 5/2010 |
| CN | 201639825 U | 11/2010 |
| CN | 201839492 U | 5/2011 |
| CN | 102131327 A | 7/2011 |
| CN | 102177768 A | 9/2011 |
| CN | 202475882 U | 10/2012 |
| CN | 202738203 U | 2/2013 |
| CN | 202759621 U | 2/2013 |
| CN | 103048983 A | 4/2013 |
| CN | 103119819 A | 5/2013 |
| CN | 203241317 U | 10/2013 |
| CN | 203243557 U | 10/2013 |
| CN | 103503377 A | 1/2014 |
| JP | 2005136532 A | 5/2005 |
| JP | 2006129098 A | 5/2006 |
| JP | 2008305800 A | 12/2008 |
| JP | 2011109784 A | 6/2011 |
| KR | 100887425 B1 | 3/2009 |
| KR | 100912039 B1 | 8/2009 |
| KR | 20090113941 A | 11/2009 |
| KR | 101009613 B1 | 1/2011 |
| KR | 20130012996 A | 2/2013 |
| KR | 20130017298 A | 2/2013 |
| KR | 20140080755 A | 7/2014 |
| KR | 20140120748 A | 10/2014 |
| WO | 2011062445 A2 | 5/2011 |
| WO | 2012010170 A1 | 1/2012 |
| WO | 2014026226 A1 | 2/2014 |
| WO | 2014109486 A1 | 7/2014 |
| WO | 2016073272 A1 | 5/2016 |

OTHER PUBLICATIONS

International Search Report, International Patent Application No. PCT/US2015/058019, dated Feb. 5, 2016, 10 pages.

Extended European Search Report, International Patent Application No. EP15857698, dated Jun. 5, 2018 (12 pages).

China National Intellectual Property Administration's Office Action and Search Report, PRC Patent Application No. 201580059998.5, dated Nov. 5, 2019 (10 pages).

* cited by examiner

CONFIGURABLE MESH NETWORK FOR AN ELECTRICAL SWITCHING SYSTEM

CROSS REFERENCE TO RELATED APPLICATION(S)

This application is a Continuation of U.S. Utility patent application Ser. No. 15/808,410, filed Nov. 9, 2017 and now U.S. Pat. No. 10,418,824 which is a Continuation of U.S. Utility patent application Ser. No. 14/698,690, filed Apr. 28, 2015 and now U.S. Pat. No. 9,843,194, which claims benefit of U.S. Provisional Patent Application Ser. No. 62/074,902, filed Nov. 4, 2014. U.S. Utility patent application Ser. No. 14/698,690 is also a Continuation-In-Part (CIP) of U.S. Utility patent application Ser. No. 14/606,881, filed Jan. 27, 2015 and now U.S. Pat. No. 9,692,236 which, in turn, claims benefit of U.S. Provisional Patent Application Ser. No. 61/932,085, filed Jan. 27, 2014. The entire disclosure of all the above documents is herein incorporated by reference.

BACKGROUND

1. Field of the Invention

This disclosure relates to systems and methods for a mesh network which can be used in conjunction with the existing electrical infrastructure in a building to provide for additional control and functionality to devices utilizing the electrical infrastructure. Specifically, it relates to retrofitted or replacement electrical switches which can replace traditional switches and operate remotely through an internal wireless communication system or which can be used to create a new network from scratch.

2. Description of the Related Art

Today there is an increasing emphasis on energy efficiency, not only for the individual and the company, who are the energy consumers, but also for energy providers. This is especially true for electrical energy. The Energy Information Administration (EIA) estimates that in 2011 about 461 Billion kW hours of electricity were used in the USA by the residential and commercial sectors. Electricity used for lighting was equal to 17% of total electricity consumed by both of those sectors. Residential lighting consumption was about 186 Billion kilowatt hours (kWh) of electricity in the USA, or about 13% of all residential electrical consumption. For the commercial sector, lighting consumed about 275 Billion kWh of electricity or 21% of all the commercial sector electricity.

This large consumption of electricity for lighting has led to governmental regulation to utilize more efficient lighting devices and the manufacture of the incandescent bulb (e.g. the lightbulb as originally contemplated in U.S. Pat. No. 223,898 to Edison) has essentially been halted. Instead, lighting is being increasingly supplied through compact fluorescent light (CFL) bulbs and halogen bulbs and to an increasing percentage, light emitting diode (LED) bulbs.

In order to save power, such as for lighting and other habitation necessities, commercial buildings have for some time now had the desire to have the building automated not only for convenience of operation, both locally and remotely, but also to control the energy usage or consumption of a building. Building automation is best exemplified as a distributed control system or the networking of electronic devices designed to monitor and control mechanical, security, fire and flood safety, lighting (especially emergency lighting), HVAC and humidity control and ventilation systems in a building.

The core functionality of a building automation system is that it keeps building climate within a specified range (particularly when people are present, but may also monitor temperature in critical facilities such as computer server rooms), lights rooms based on an occupancy schedule or detection of actual occupancy (in the absence of overt switching to the contrary), monitors performance and device failures in all systems, and provides malfunction alarms to building engineering/maintenance staff and contractors. Essentially, it acts to maintain the building in a manner that takes into account its current occupancy and use. Thus, the building does not light rooms where light is not needed, heat rooms where heat is not needed, or otherwise utilize energy in a manner where someone does not directly benefit from the energy use. It also does this provision if electricity without input from the user of the facility. By doing so, it reduces building energy and maintenance costs compared to a non-controlled building.

Another advantage of automated building operation is in rapid detection of, and reaction to, problems. For example, if a critical HVAC system goes down, the automation system may notify a troubleshooter in charge of computer servers. This person can then remotely switch over to a backup cooling system to prevent damage or shutdown of critical servers. Alternatively, the system can automatically detect the problem, and immediately switch over to backup systems.

Home automation is the residential extension of commercial building automation. It is automation of the home, housework or household activity.

Home automation may include centralized control of lighting, HVAC (heating, ventilation and air conditioning), appliances, security features such as locks of gates and doors or alarms, and other systems, to provide improved convenience, comfort, energy efficiency and security. Home automation for the elderly and disabled can provide increased quality of life for persons who might otherwise require caregivers or institutional care. In effect, home automation serves to provide automation to features to eliminate the need of an occupant to control a particular facet of their environment manually. Thus, for example, doors can open upon approach without the need of a user to manually unlock and open them, rooms can automatically be configured to a comfortable temperature, and lighting can be used only when necessary to see. This supplies both energy savings and improved convenience.

The popularity of home automation has been increasing greatly in recent years due to much higher affordability of automation and networking components and the simplicity and ubiquity offered through smartphone and tablet control via home networks. As such "smart" mobile devices (essentially small network enabled general purpose computers which maintain relatively constant communication via a network of some form) are often regularly in the possession of an individual now, they provide for ready central control for networked devices and for powerful, portable, and personal readily available computing power. The concept of the "Internet of Things", which is essentially a buzz phrase for the concept of networking computers with specialized functions together with each other, has tied in closely with the popularization of home automation.

Generally, a home automation system integrates control devices present in a house with a smart phone or similar control device. The techniques employed in home automation include those used in building automation as well as the control of specific domestic activities, such as home entertainment systems, houseplant and yard watering, pet feeding, changing the ambiance "scenes" for different events (such as dinners or parties), and the use of domestic robots for automatically carrying out certain activities (such as vacuuming). Traditionally devices are connected through a superimposed and existing home network (e.g. a wireless network with coverage generally in the area of the home) to allow control of the automation devices by a personal computer controlled by the homeowner. The systems typically also allow remote access and control of the automation devices from the Internet via a web browser, smartphone "app", or similar technology. Through the integration of information technologies with the home environment, systems and appliances in the home are able to communicate in an integrated manner which results in convenience, energy efficiency, and safety benefits.

One problem with home automation systems currently is that the automation devices available tend to be specific to a particular narrow operation because of the need to retrofit the controlled device for automation control and the desire for proprietary control and integration. For example, it is easy to buy a system to enable a user to control a single light bulb from their smartphone, to control their thermostat from their computer, or to remotely mow the lawn from a controller by the bed. However, the underlying control devices often are separate, have no integrated single control (they each use their own Internet portals and/or apps to provide the control), and cannot monitor or interact with each other. For example, the thermostat may detect that the homeowner is not home, but cannot communicate it to the light bulb in the bedroom and have the light bulb turn itself off or to indicate to the vacuum cleaner that now is a good time to vacuum the living room.

In many respects, these technologies are not automation systems, they are simply "remotely controlled" as they allow for the user to remotely turn off and on a light or the air conditioning in their home from their office but do not really "automate" lighting control. The automation the systems appear to provide is often a mere "auto-off." Similarly, these automation devices are usually dependent on the existence of an overarching home network infrastructure that can be power demanding. Thus, the robotic vacuum may activate the lights in a room even though it clearly doesn't need them simply because the systems cannot communicate with each other.

More robust home automation systems do exist but usually have to be installed at great expense when the house is first built as many of the systems are reliant on being supplied with wired interconnectivity to effectively function together. For example, most automation systems require wires for electricity, and also are often supplied with wires for secure connectivity and networking between components. Structures such as walls, electrical, plumbing, and other infrastructure can hinder communication and connectivity in a variety of ways, and homes not built to handle communication in the presence of signal blocking walls and the like can often not obtain a high degree of networking making a home automation system more of a single room (or even single device) novelty than a valuable control apparatus. Further, such wired system are often rendered obsolete or "archaic" as technology changes because they are hard-wired in to the home. A good example of this is how built in whole house stereos that utilize multi disc CD-changers went from state of the art, to obsolete with the advent of downloadable music files and on-demand broadcast stations.

While the construction of networked infrastructure at the time of construction is effective in new build homes, it can be overly expensive (and extraordinarily difficult) for existing structures and, as such, there is a need for retrofitting existing houses with only conventional electrical wiring with a system which can respond remotely on a point-to-point basis or from a hub controlled network. Basically, to be able to adapt a home automation system to the latest technology, there is a benefit to not having the system built in as that allows for the system to be removed and replaced or updated as technology changes.

Another problem with home network systems is that, as they operate currently, they constantly consume power associated with the backbone communication system (home network) because the backbone communication system requires essentially constant communication be maintained with all the connect devices and external network such as the Internet. Without such constant connections, the remote control capabilities, and much of the automation, may not work. As many systems are installed to remotely control lights or similar items to reduce power costs, this is a dichotomy as the power saving switches (which turn the lights on and off automatically) may require a power draining network hub, and their own on-board power systems, to operate near continuously to provide for effective control. Thus, the switch may allow for the light to be turned off to save energy, but the switch itself may consume additional energy when the light is both on and off. Thus, the system may actually save less energy than implementation of conventional power saving and remote control techniques (e.g. the use of timer or motion sensing switches on lamps and the practice of turning lights off when one leaves the room). Most remote control switches on the market today are dependent on a central hub for communication.

Multi-way switches provide for unique problems in device control. A multi-way switch, as contemplated herein, is generally a situation where a switch can provide for more than a binary (on/off) control (e.g. a dimmer) or where a multitude of switches can control a single object. Multi-way switches are particularly prevalent in residential lighting applications. In a first instance, floor plans of residential structures are often more open than those of commercial structures and rooms will often have multiple entry ways. In order for lighting to be turned on and off effectively with multiple-entryway rooms, it is generally necessary that each entryway have the ability to control the lighting of the entire room independently of the setting of any other switch controlling the lighting in that room. In its simplest form, this is the ability of a user to turn on a light at switch A, cross the room and then turn off the same light at switch B. While this concept is near ubiquitous in housing, it actually requires very complicated wiring mechanisms and additional components to implement compared to having a single switch control. As such it is very wasteful of resources such as metal wiring when installed. The cost of wiring (independent of the actual fixture costs) in a new structure generally has two components, first the cost of the wire itself, and second, the cost of the labor to install it. In residential houses the major driver is the labor, but the material is not inconsequential at 20 to 30% of the total cost.

In these types of arrangements, the two-way, three-way and higher-way arrangement of switches (where the same fixture can be controlled from multiple switches) requires significantly more labor time from more experienced electricians, specialized components, and more wire to interconnect the operation. In effect, if a system is wired simply where the wires connect directly to the outlet from both switches, one has to turn both switches off to turn the outlet off, while any one of them being on will result in power. This does not allow for free toggling. For example, wiring a single bulb to be controlled from two switches with free toggling (where any change on either switch toggles the lights' current status) requires replacing the standard two-way switches normally used in lighting applications with three-way switches (or an equivalent circuit), wired in a particular pattern. For three or more switches, three-way and four-way switches are required in particular patterns. This complication therefore costs significantly extra to install both in parts (due to the more complicated switches and additional wiring) and labor (to make sure they are connected correctly).

The cause of this complication is that the physical operation of the switch (e.g. toggling) is physically connected to the functionality of the switch (e.g. communicating electricity). A light switch, quite literally, is connected into the wire and directly acts as a physical switch to allow or stop electrical flow. Because each wire leading into an outlet is either on or off, it can be impossible to provide for the ability to freely toggle power from any of the switches without adding additional paths which reconnect the flow in different ways.

One major problem in all electrical wiring systems is that once an electrician has wired the system during construction (which usually occurs when only the skeleton of the structure exists and it is easy to construct things that will eventually be within walls), the only way to change the system is a physical rewiring of the system. This usually requires the re-running of wires, as well as changes to the switches themselves. This is usually very costly as it can require tearing the surfaces (usually drywall) off of walls to access the wires, or it requires sophisticated tools to thread new wires through difficult to access (and even to see) passageways.

Lighting applications also often need the ability to control electricity in an analog fashion. Dimming switches, fan controls, and similar devices do not provide a simple on/off control to a light, but allow the amount of electricity flowing to the device to be adjusted in a continuous or stepped fashion to allow for additional control. These systems can be particularly problematic from a wiring perspective as it can be necessary to know which switch has primary control and many network capable switches are simply unable to operate in a non-binary fashion.

SUMMARY

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, there exists a need for a smart switch system that can be retrofitted into an existing wired electrical system replacing existing switches (whether as a standalone single switch or part of a multi way switch configuration) that can be controlled locally nominally by touch, controlled remotely by a remote, or controlled remotely by a computer to provide for local networking. Further, this system for any one application (e.g. a particular light) needs to be able to operate in conjunction with other switches and controls to allow for effective home automation. Further, it is desirable that multi-switch arrangements be available for fixtures and devices that are not currently wired for such arrangements. Further, operation of such switches, to be useable in a retrofit, needs to require no additional wiring (that is, beyond standard electrical connections which already exist in a facilities infrastructure) and preferably the system would actually be able to operate with minimal or no electrical connection outside of that already built in to the structure.

There is described herein, among other things, a power control system for retrofitting into a structure, the system comprising: a master switch configured to replace a traditional lightswitch, the master switch comprising: a first activation object; a physical switch configured to connect and disconnect an outlet to a power source; a first computer configured to control the physical switch; and a first network communication system configured to receive instructions from a network and provide them to the computer; wherein the computer will adjust a configuration of the physical switch upon receipt of an instruction from the first network communication system or activation of the first activation object; a remote switch, the remote switch comprising: a second activation object; and a second network communication system configured to provide instructions to the network; wherein the second network communication system will provide an instruction to the network upon activation of the second activation object.

In an embodiment of the power control system, the physical switch is an SPDT relay.

In an embodiment, the power control system further comprises an analog control circuit for providing instructions from the computer to the physical switch.

In an embodiment of the power control system, the network is a Bluetooth Low Energy network.

In an embodiment of the power control system, the first activation object is a capacitive touch plate.

In an embodiment of the power control system, the instruction includes: an address of the network; and an identifier of the master switch to which the instruction is directed.

In an embodiment of the power control system, the instruction also includes a security code.

In an embodiment of the power control system, the security code is an RSA code.

In an embodiment of the power control system, the second activation object is a capacitive touch plate.

In an embodiment of the power control system, the network is a self-organizing network.

In an embodiment of the power control system, the first computer can act as a hub in the self-organizing network.

In an embodiment of the power control system, the remote switch further comprises a second computer.

In an embodiment of the power control system, the second computer can act as a hub in the self-organizing network.

In an embodiment of the power control system, the self-organizing network is connected to a remote hub which is connected to the Internet.

In an embodiment, the power control system further comprises a controller, the controller comprising: a third computer including software instructions for receiving an indicator of an activation; and a third network communication system configured to provide instructions to the network; wherein the third network communication system will provide an instruction to the network upon the third computer receiving an indicator of activation.

In an embodiment of the power control system, the third network communication system is connected to the network via the Internet and a hub connected to the network.

In an embodiment of the power control system, the controller is a mobile device.

In an embodiment of the power control system, the software instructions include instructions for activating the physical switch according to a timetable.

In an embodiment of the power control system, the software instructions include instructions for disconnecting the physical switch regardless of activation of the first activation object or the second activation object.

In an embodiment of the power control system, the master switch further comprises a power measurement system.

In an embodiment of the power control system, the master switch can communicate power measured by the power measurement system to a user.

In an embodiment of the power control system, the master switch further comprises a fault detection system.

In an embodiment of the power control system, the master switch can communicate a fault detected by the fault detection system to a user.

In an embodiment of the power control system, the second activation object is an occupancy sensor.

In an embodiment of the power control system, the occupancy sensor is a motion sensor.

In an embodiment of the power control system, the second activation object is activated by the second activation object detecting a mobile device nearby.

In an embodiment of the power control system, the master switch replaces an existing manual switch in a multi-way configuration that controls a single outlet while a second manual switch in the multi-way configuration remains; and wherein the master switch, the remote switch, and the existing manual switch control the single outlet.

In an embodiment of the power control system, the master switch replaces an existing manual switch in a multi-way configuration that controls a single outlet and the remote switch replaces a second manual switch in the multi-way configuration; and wherein the master switch and the remote switch control the single outlet.

DESCRIPTION OF THE PREFERRED EMBODIMENT(S)

Figure 1:
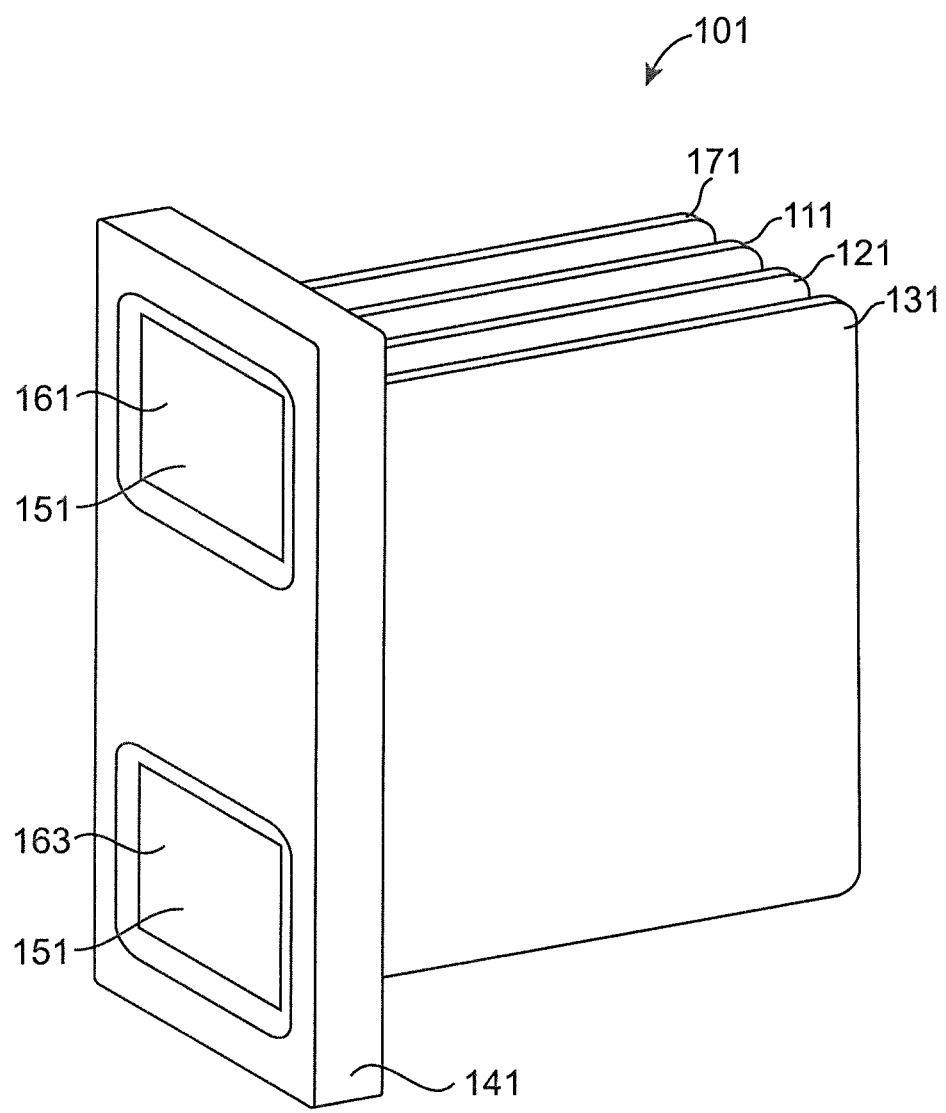
FIG. 1 shows an embodiment of a master switch showing how it can simulate an existing light switch.

The systems and methods described herein provide that while a device to be operated by a switch would almost certainly require some form of power to operate, there is no need that the "switch" being activated utilize the same power source that is used to control the provision of power to that device. The present systems and method serve to provide for a home automation and centralized control system by providing a retrofit switch network which utilizes a single physical switch including computer control and network connectivity in a fashion that the device(s) associated with each switch can be operated from any paired object.

Generally, this disclosure will refer to power "outlets". In general parlance, a power outlet is a point of connection which allows for devices which can be completely external to the power infrastructure of a facility to be connected to the power infrastructure. These devices may be external to the housing infrastructure (such as, but not limited to, a refrigerator or a floor lamp), which would mean they generally connect to the infrastructure via a "plug outlet". Alternatively, the device may be a "fixture" (such as, but not limited to, a ceiling fan or light socket) where the object is actually affixed in a position that does not allow any third party object to connect to the infrastructure at that point. Effectively, the device and the outlet are combined in a fixture. Further, fixtures usually include wall mounted switches which allow power to them to be turned on or off. The problem with the traditional use of these terms, however, is that a light "fixture" (for holding a light bulb) and a plug "outlet" (into which a table lamp can be plugged) are fundamentally the same. Each will allow an object connected to it via a coupler (e.g. the lamp or light bulb) to be connected to the power infrastructure of the facility and powered.

It is also well known that certain residences lack any fixtures, and rely upon switched plug outlets to act as fixtures, and that one can readily attach adapters to light fixtures allowing them to provide plug outlets. Thus, for purposes of this disclosure, any point of connection where an object which does anything other than distribute power within the infrastructure can be connected, is called an "outlet". Outlets that include switches allowing power to them to be alternatively supplied or not are switched outlets (this is common for fixtures), while those that will always supply power to anything connected to them at all times are unswitched outlets (which is more common for plug outlets).

Throughout this disclosure, the term "computer" describes hardware which generally implements functionality provided by digital computing technology, particularly computing functionality associated with microprocessors. The term "computer" is not intended to be limited to any specific type of computing device, but it is intended to be inclusive of all computational devices including, but not limited to: processing devices, microprocessors, personal computers, desktop computers, laptop computers, workstations, terminals, servers, clients, portable computers, handheld computers, smart phones, tablet computers, mobile devices, server farms, hardware appliances, minicomputers, mainframe computers, video game consoles, handheld video game products, and wearable computing devices including but not limited to eyewear, wristwear, pendants, and clip-on devices.

As used herein, a "computer" is necessarily an abstraction of the functionality provided by a single computer device outfitted with the hardware and accessories typical of computers in a particular role. By way of example and not limitation, the term "computer" in reference to a laptop computer would be understood by one of ordinary skill in the art to include the functionality provided by pointer-based input devices, such as a mouse or track pad, whereas the term "computer" used in reference to an enterprise-class server would be understood by one of ordinary skill in the art to include the functionality provided by redundant systems, such as RAID drives and dual power supplies.

It is also well known to those of ordinary skill in the art that the functionality of a single computer may be distributed across a number of individual machines. This distribution may be functional, as where specific machines perform specific tasks; or, balanced, as where each machine is capable of performing most or all functions of any other machine and is assigned tasks based on its available resources at a point in time. Thus, the term "computer" as used herein, can refer to a single, standalone, self-contained device or to a plurality of machines working together or independently, including without limitation: a network server farm, "cloud" computing system, software-as-a-service, or other distributed or collaborative computer networks.

Those of ordinary skill in the art also appreciate that some devices which are not conventionally thought of as "computers" nevertheless exhibit the characteristics of a "computer" in certain contexts. Where such a device is performing the functions of a "computer" as described herein, the term "computer" includes such devices to that extent. Devices of this type include but are not limited to: network hardware, print servers, file servers, NAS and SAN, load balancers, and any other hardware capable of interacting with the systems and methods described herein in the matter of a conventional "computer."

For purposes of this disclosure, there will also be significant discussion of a special type of computer referred to as a "mobile device". A mobile device may be, but is not limited to, a smart phone, tablet PC, e-reader, or any other type of mobile computer. Generally speaking, the mobile device is network-enabled and communicating with a server system providing services over a telecommunication or other infrastructure network. A mobile device is essentially a mobile computer, but one which is commonly not associated with any particular location, is also commonly carried on a user's person, and usually is in constant communication with a network.

Throughout this disclosure, the term "software" refers to code objects, program logic, command structures, data structures and definitions, source code, executable and/or binary files, machine code, object code, compiled libraries, implementations, algorithms, libraries, or any instruction or set of instructions capable of being executed by a computer processor, or capable of being converted into a form capable of being executed by a computer processor, including without limitation virtual processors, or by the use of run-time environments, virtual machines, and/or interpreters. Those of ordinary skill in the art recognize that software can be wired or embedded into hardware, including without limitation onto a microchip, and still be considered "software" within the meaning of this disclosure. For purposes of this disclosure, software includes without limitation: instructions stored or storable in RAM, ROM, flash memory BIOS, CMOS, mother and daughter board circuitry, hardware controllers, USB controllers or hosts, peripheral devices and controllers, video cards, audio controllers, network cards, Bluetooth® and other wireless communication devices, virtual memory, storage devices and associated controllers, firmware, and device drivers. The systems and methods described here are contemplated to use computers and computer software typically stored in a computer- or machine-readable storage medium or memory.

Throughout this disclosure, terms used herein to describe or reference media holding software, including without limitation terms such as "media," "storage media," and "memory," may include or exclude transitory media such as signals and carrier waves.

Throughout this disclosure, the term "network" generally refers to a voice, data, or other telecommunications network over which computers communicate with each other. The term "server" generally refers to a computer providing a service over a network, and a "client" generally refers to a computer accessing or using a service provided by a server over a network. Those having ordinary skill in the art will appreciate that the terms "server" and "client" may refer to hardware, software, and/or a combination of hardware and software, depending on context. Those having ordinary skill in the art will further appreciate that the terms "server" and "client" may refer to endpoints of a network communication or network connection, including but not necessarily limited to a network socket connection. Those having ordinary skill in the art will further appreciate that a "server" may comprise a plurality of software and/or hardware servers delivering a service or set of services. Those having ordinary skill in the art will further appreciate that the term "host" may, in noun form, refer to an endpoint of a network communication or network (e.g. "a remote host"), or may, in verb form, refer to a server providing a service over a network ("hosts a website"), or an access point for a service over a network.

Throughout this disclosure, the term "real-time" generally refers to software performance and/or response time within operational deadlines that are effectively generally cotemporaneous with a reference event in the ordinary user perception of the passage of time for a particular operational context. Those of ordinary skill in the art understand that "real-time" does not necessarily mean a system performs or responds immediately or instantaneously. For example, those having ordinary skill in the art understand that, where the operational context is a graphical user interface, "real-time" normally implies a response time of about one second of actual time for at least some manner of response from the system, with milliseconds or microseconds being preferable. However, those having ordinary skill in the art also understand that, under other operational contexts, a system operating in "real-time" may exhibit delays longer than one second, such as where network operations are involved which may include multiple devices and/or additional processing on a particular device or between devices, or multiple point-to-point round-trips for data exchange among devices. Those of ordinary skill in the art will further understand the distinction between "real-time" performance by a computer system as compared to "real-time" performance by a human or plurality of humans. Performance of certain methods or functions in real-time may be impossible for a human, but possible for a computer. Even where a human or plurality of humans could eventually produce the same or similar output as a computerized system, the amount of time required would render the output worthless or irrelevant because the time required is longer than how long a consumer of the output would wait for the output, or because the number and/or complexity of the calculations, the commercial value of the output would be exceeded by the cost of producing it.

Figure 5:
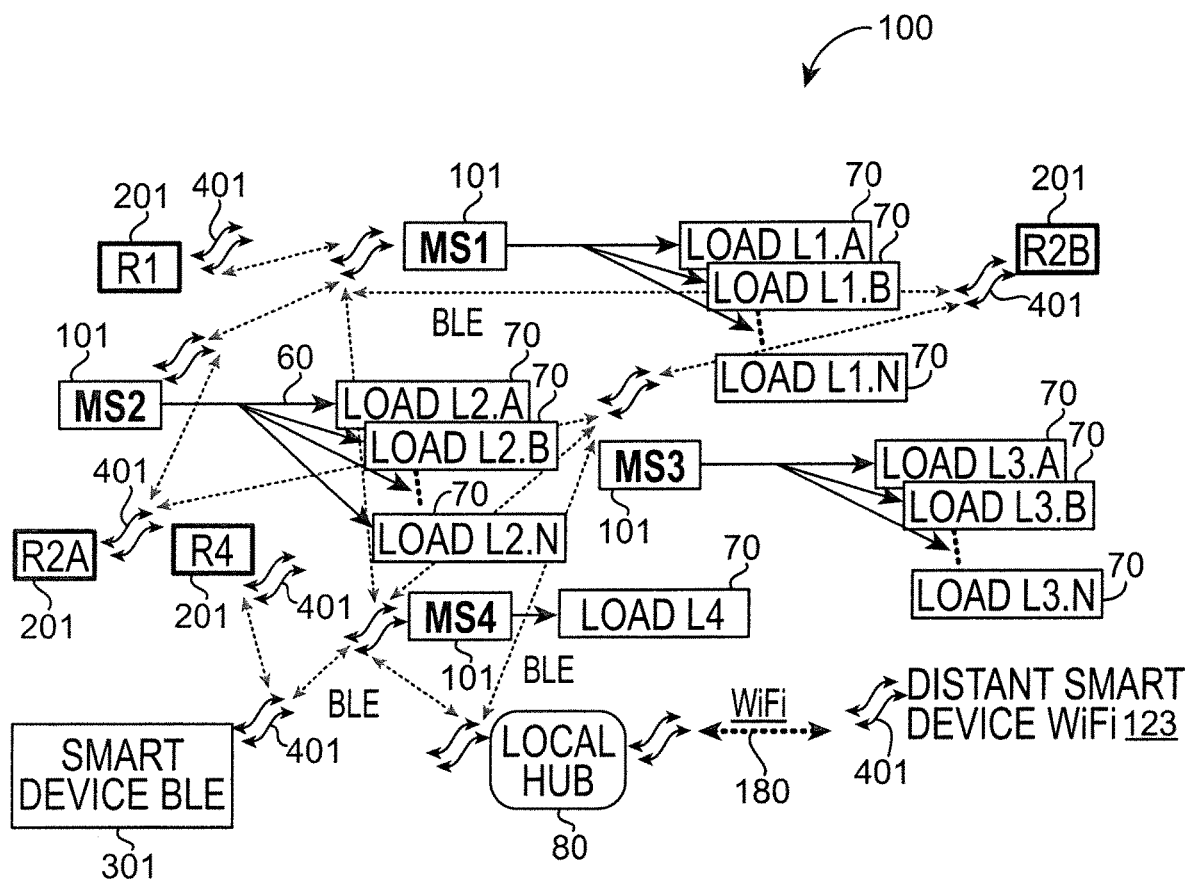
FIG. 5 shows a block diagram of an embodiment of a mesh network and system configuration which could be used in a home automation setting.

As generally illustrated in FIG. 5, the present systems (100) are to a methodology for retrofitting a residential or commercial electrical system to provide for automation as well as improved flexibility. The systems (100) herein are often referred to as "smart" electrical systems (100) because they allow for each element of the system (100) to communicate with other elements of the system (100). While the systems (100) are generally designed to retrofit existing structures, one of ordinary skill in the art would understand that they could also be used to as part of the creation of an electrical infrastructure to provide the same level of control and automation as in a retrofit. The system (100) generally utilizes three primary components each of which provides for particular functionality in the system (100).

Figure 3:
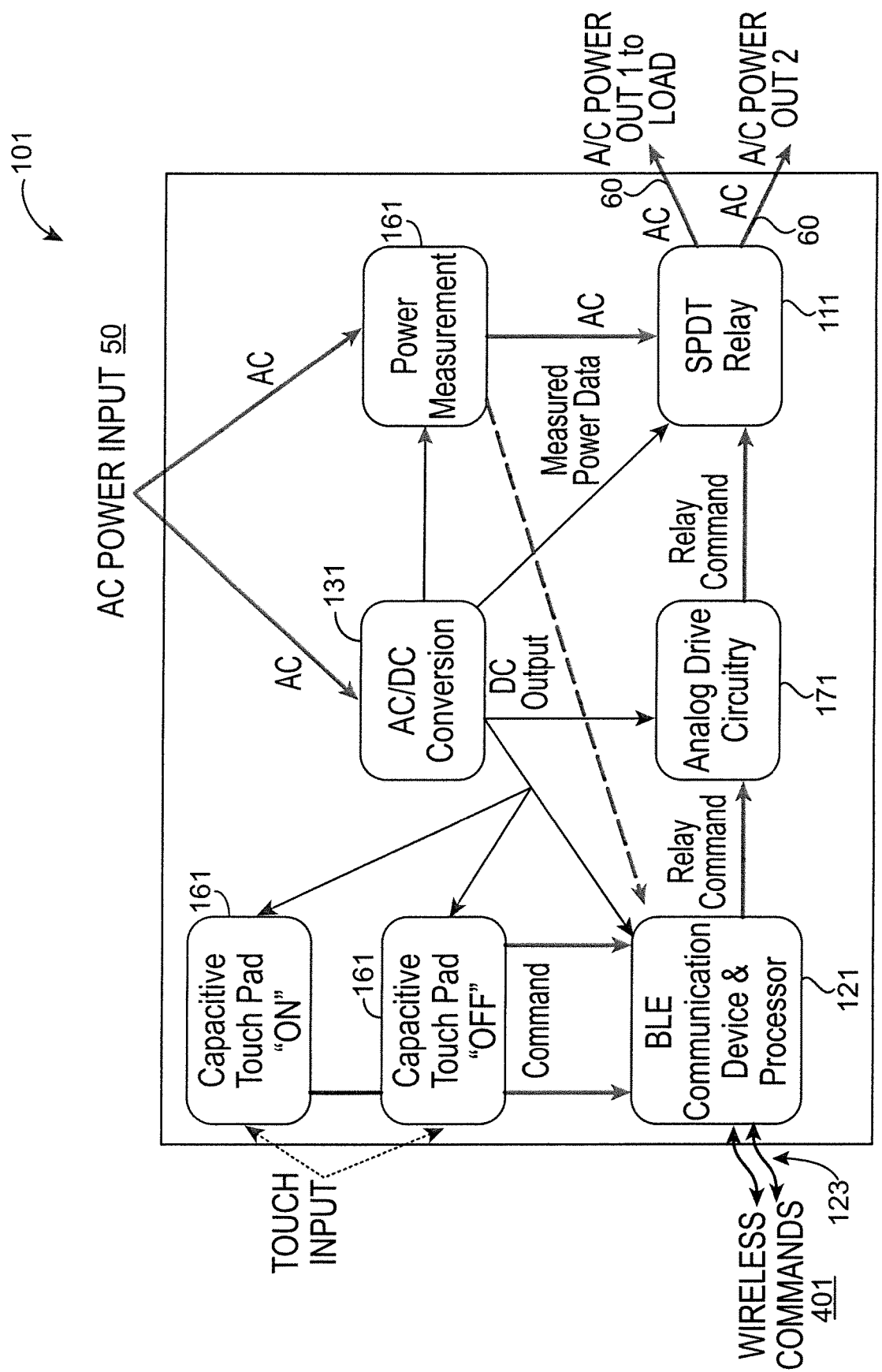
FIG. 3 shows a block diagram of an embodiment of a master switch useable in an embodiment of a mesh network.

The first of the components is a master switch (101). The master switch (101) is designed to be wired in place of an existing electrical switch (e.g. a light switch) within the home electrical infrastructure or in place of an electrical access point (e.g. a plug outlet) in the same infrastructure. Examples are shown in FIGS. 1 and 3. The master switch (101) will include a physical switch (111) which will act to both provide for electricity to flow from the electrical infrastructure (50) of the facility (to which the master switch (101) is connected) to an output wire (60) to which electrical flow is desired to be controlled, and to disconnect the same input infrastructure (50) from that same output wire (60). In many respects, the key element of a master switch (101) is that it is capable of connecting and disconnecting a device (70) in the house which uses electrical power to the electrical power in the power grid (50) of the house.

A device (70) is any thing in the home automation system which is controlled by some aspect of the home automation system. In most cases, devices (70) will be traditional home fixtures which are wired to existing electrical (or other) infrastructure (50) and existing mechanical switches. Thus, in an embodiment, a device (70) can comprise things such as, but not limited to, ceiling fans, electrical heating systems (and controllers therefore), and electric light fixtures. A device (70) can also comprise something which is capable of supplying electricity to the infrastructure such as a solar panel or windmill. A device (70) can also be an electrical device plugged into an electric outlet in a standard and well understood fashion such as, but not limited to, an appliance, television, or toy. In a basic sense, a device (70) as used herein is anything which resides on and utilizes the existing electrical infrastructure (50) of a facility such as, but not limited to, a house, barn, multi-unit dwelling, connecting building, or other structure.

Regardless of the type of device (70) contemplated, the device (70) will generally always have a point of connection and disconnection form the electrical grid (50) of the facility. For built in fixtures, this will usually comprise some form of mechanical switch separated from the fixture (e.g. a light switch, even if the light switch controls a fan). In some cases, the switch may be directly at the fixture, e.g. in the case of a pull cord fixture where the switch is in the socket to which the lamp is connected. For electrical devices that are not hardwired, they will generally need to be interconnected to an outlet via a plug outlet. It should be apparent from the above that a plug outlet is effectively similar to a direct wired connection, it just allows for repeated connection and disconnection of devices (70). Thus, the present system (100) could comprise a switch attached to a plug outlet (as is often the case for residences built in certain eras) or could be a system (100) whereby the plug outlet effectively becomes the housing for the master switch (101), which may or may not actually comprise a physical switch for a user to operate, but can be controlled by a remote switch (201).

It should also be recognized that some devices (70) are "smart devices" this may be any type of device (70) that obtains power either from the electrical infrastructure (50) of the house, or from a self-contained power source (such as, but not limited to a battery), but which has an internal (or onboard) capability to communicate with networks of known types. Examples of "smart devices" can include things such as remote thermostats (such as, but not limited to the Nest™ thermostat), lighting controllers that interface with smartphones or other computer networks, and other remotely controllable devices such as certain household robots. The only major differences between a basic device and smart device is that a smart device includes internal capability to communicate with network hubs (80) (or other devices (70)) which capability is not present on a basic device, and that a smart device, because it may include a switch and power source as part of its structure, does not necessarily need to be connected to the electrical infrastructure (50) of a house in order to operate, but is connected to a communication network infrastructure (180).

Effectively, every powered object forming the infrastructure of a house is of the form of a device (70). While a user could have an object which is completely disconnected from the house in the house (e.g. a battery powered alarm clock or a wind up kitchen timer) these are things that are not considered part of the infrastructure of the house for purposes of this disclosure.

Figure 2:
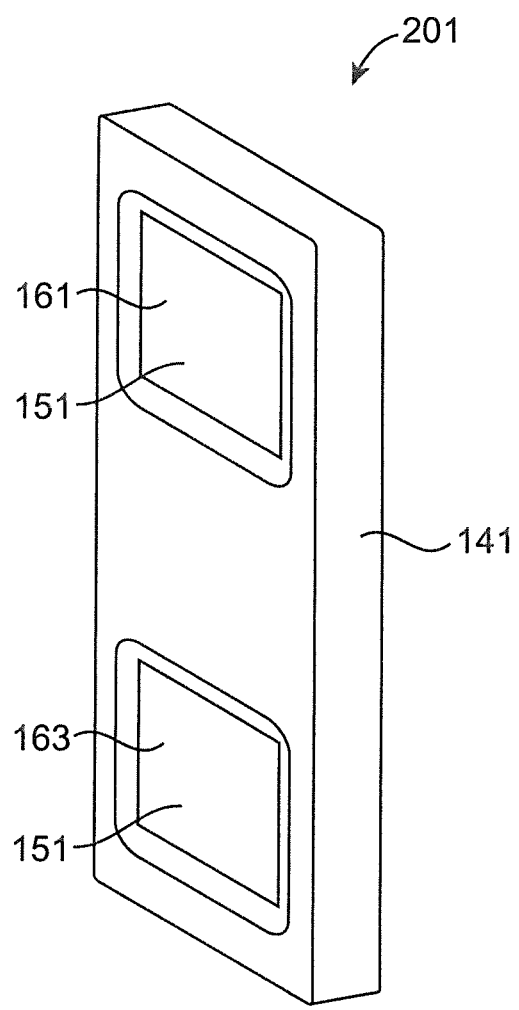
FIG. 2 shows an embodiment of a remote switch showing how it can simulate an existing light switch.
Figure 4:
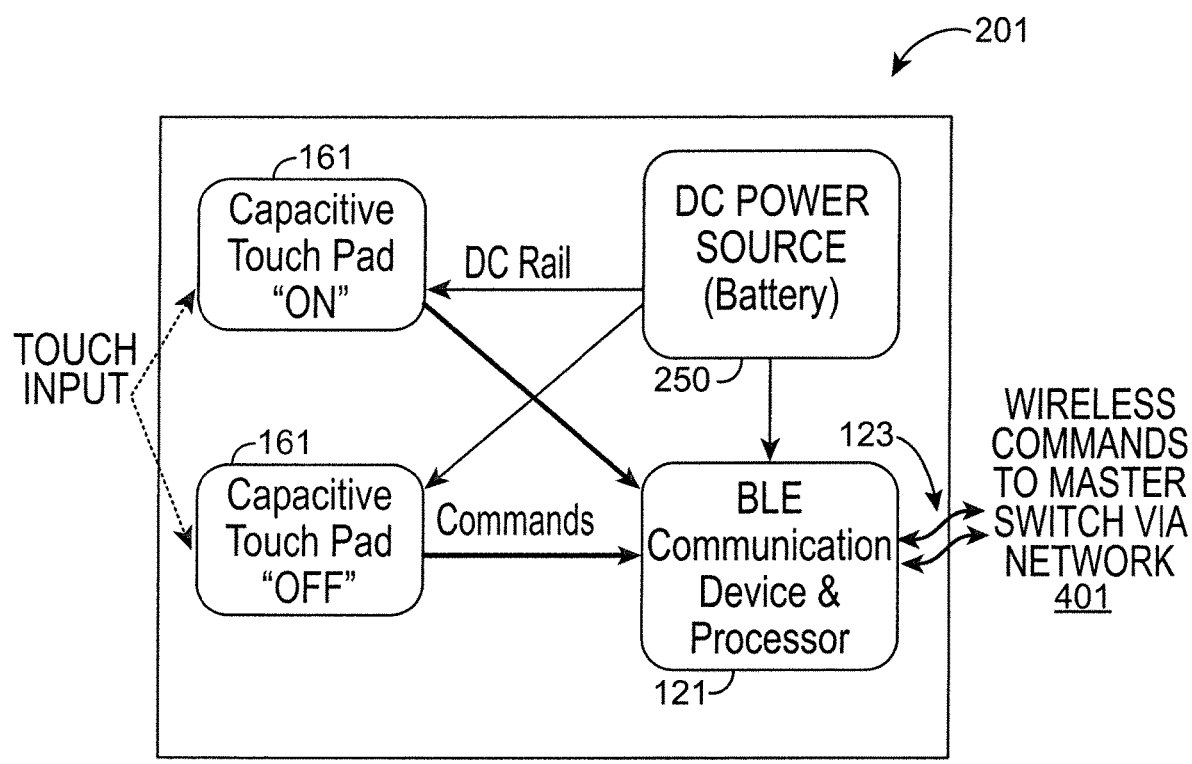
FIG. 4 shows a block diagram of an embodiment of a remote switch useable in an embodiment of a mesh network.

The second major component of the system (100) as shown in FIGS. 2 & 4 is a remote switch (201). A remote switch (201) is, in many respects, a switch in name only. What it really is an indicator of a state change. The remote switch (201), in its simplest embodiment, is a device which is designed to simulate a mechanical switch, but is not really a switch at all. A mechanical switch works by receiving an indication of a state change (e.g. a user "flips the switch") and then altering the switch state. A remote switch (201) transmits a received indication of state change to a master switch (101) via a network and the master switch's (101) onboard computer (121) can detect that communication, and appropriately alter the mechanical switches (111) on-board the master switch (101) to carry out the prescribed state change. Thus, if the user was to indicate on a remote switch (201) that they wish to toggle the current power situation for a particular light, the master switch (101) for that light receives that information, and toggles the power by changing its on-board switch (111).

The third component is a controller (301). A controller (301) is essentially a very broad form of remote switch (201) and is often in the form of specialized software on a general purpose computer such as a mobile device. The controller (301) may be, for example, a mobile device application (app) which serves to allow for a user to communicate with any master switch (101) and thus control any master switch (101). In effect, a controller (301) is thus a remote switch (201) which provides for the ability to interface with any or all the master switches (101), as opposed to being specifically directed to only interacting with a limited number of master switches (101) as would generally be the case with a remote switch (201).

Generally, the system (100) works by providing a plurality of master switches (101). Each master switch (101) generally includes a special purpose computer (121) which is designed to fit within a traditional electrical switch box and provide network communication capability (123) as well as onboard processing and memory. The master switch (101) also includes a physical switch (111) which can serve to connect or disconnect a wire (60) from the electrical infrastructure (50) of the facility. Each device (70) is connected to an outlet connected to the wire (60) which is designed to be switched as part of the automated system. Each such outlet will generally be associated with a single master switch (101). Thus, power flow to each outlet is preferably controlled by one, and exactly one, master switch (101) in a preferred environment. This is not necessarily required and in an alternative embodiment a master switch (101) may control multiple interlinked outlets or master switches (101) may overlap control with other master switches (101). However, it is generally preferred that each outlet have exactly one master switch (101) as this provides for the greatest flexibility. The master switches (101) will then form a mesh network (401) which serves to provide the automation. The mesh network (401) may be self-organizing, self-correcting and/or self-repairing, depending on embodiments.

A master switch (101), as best shown in FIGS. 1 and 3, is generally designed to be retrofitted in an existing switch box. It is well understood in the industry that light switches are mounted in a structure by being hardwired in a generally metal or plastic switch box, to the electrical wiring (60) connecting to the object they switch. This allows for a relatively simple swapping of different types of switches even by an end homeowner. For example, a traditional toggle switch can be readily removed from the wall box, disconnected form the wiring (60) and (50), and a replacement paddle type switch can be positioned and wired in. Generally, the box structure and wiring is hidden by a faceplate (141) which is a plastic surround for the switch device.

In the present device, the first type of master switch (101) is designed to be fitted in place of a traditional switch in the same manner either as a retrofit or to allow for easy integration into new construction through the use of traditional construction techniques. It will be hardwired into the wiring (60) and (50), placed in the box, and a faceplate (141) will be used to integrate it with the surface of the facility to which it is attached. However, the master switch (101) of the present device does not simply comprise a physical switch and control to be operated by the user. Instead, the master switch (101), as shown in FIGS. 1 and 3 will include a form of activation object (151) or other object which is nominally operated by physical contact which is to be activated by the user. This can be a traditional toggle switch, dimmer dial, or paddle switch, or can be a more complicated device such as a capacitive dimmer pad (161) or even an occupancy sensor such as a motion sensor (163) which does not require contact to activate.

It should be recognized that in an embodiment, there is no need for the master switch (101) to include any form of activation object (151) and all activation can be provided from remote switches (201). However, as the master switch (101) is designed to be positioned into an existing switch box in place of a traditional light switch, it is generally logical for the master switch (101) to include some kind of activation object (151). However, a master switch (101) can also be used in place of a plug outlet (61). In this case, the master switch (101) will generally include the same switching functionality, but will include appropriate plug connections for connecting external electrical devices. It will also often not include an activation object (151) for operation by a user as it may be relatively inaccessible.

Regardless of whether or not the master switch (101) includes an activation object (151), the physical switch (111) is generally connected to a specialized computer (121) which is generally part of the master switch (101) and will be held inside the mounting box. The computer (121) will generally serve to control power flow through the wiring (50) and (60) to which the master switch is connected and may draw power for its own operation from the wiring input (50) that it is connected to. Thus, in its most simple operation, when the activation object (151) is activated by a user, the computer (121) detects that the activation object (151) has been activated, and then commands relays or similar structures forming a physical switch (111) to make a connection between the input (50) and output (60) wires to which it is connected. The computer (121) will also generally include network interconnectivity and may connect using a variety of protocols to one or more networks. Generally, at least one such network will be the mesh network formed of the master (101) and remote (201) switches. Another may be a network (180) formed by a traditional network hub (80).

The master switch (101) is designed to be wired into the existing electrical system in place of a conventional switch or outlet and is used to replace a conventional switch in the control of an associated device (70). The existing input wiring (50) provides an AC power source to the master switch (101) and the master switch (101) ultimately serves as the "master source" which provides power to the device (70) associated with the master switch (101). In a simple example, an installed lighting fixture (70) in a house generally has a hardware switch built into the wall which serves to cut off or supply power from the electrical infrastructure (50) to that lighting fixture (70). The master switch (101) serves the same purpose and can be provided in any form so as to duplicate the form of the electricity being provided to the device (70). Generally a master switch (101) will be designed so as to take the same space as standard light switches which already exist in specific standardized sizes and configurations.

Input power (from the electrical infrastructure (50) of the structure) to the master switch (101) will generally be converted to DC power via an ac/dc converter (131) to drive circuitry for the activation object (151) which can be controlled by a user. Network communication (123) is also powered and may be in the form of a BLE Bluetooth communication device or any other wireless device using any network protocol known now or later discovered. The computer processor as well as any analog drive circuitry and power measurement components (161) on-board the master switch (101) can be similarly powered. Capacitive touch pads (161) comprise an embodiment of the activation object (151) and are activated by touch or proximity and send the command signal to the processor to activate or de-energize the relay (111) appropriately. Analog drive circuitry can ensure that the command from the processor applies and holds the appropriate voltage and current to the relay coil (111) until that command is changed.

The processor onboard the master switch (101) computer (121) can also receive wireless commands (401) from one or more associated remote switches (201) or from a controller (301). To ensure that the message received is intended to activate a specific master switch (101), the transmitted message format may include addresses of the specific network and the specific master switch (101) as well as the command instruction. The message may also contain a security code (such as an RSA code) to avoid any ambiguity/confusion within the communication range and to inhibit intrusion into the switch system (100).

To provide power, the physical switch (111) may be an SPDT relay (111) controlled to connect and disconnect the input power (50) by an analog control circuit (171) which is in turn controlled by a microprocessor in computer (121) that receives commands directly from the attached touch pad (161) or remotely (123) from a remote switch (201) or controller (301). Alternatively, the switch (111) may be any other kind of switch such as, but not limited to, a solid state switch, a MOSFET, IGBT, transistor, or any other means or system capable of connecting or disconnecting an electrical connection. Input power (50) may be directed out on one of two pins via the relay (111). The load(s) (70) is (are) connected to the N/O (normally open) pin of the relay (111). Pin 2 is normally closed and may be used when the master switch (101) is used to replace an existing switch which is already wired into a three way configuration. The power (50) may be routed through a power measurement chip (161). That measurement chip (161) can be interrogated from the processor (121) and the data reported out via the communication channel (123) to a controller (301) or object of the user. It should be recognized that in an alternative configuration, the processor (121) and associated software can be replaced by a circuit which has the same functionality represented entirely in hardware.

As should be apparent from the above, the master switch (101) simply acts to provide additional function to the existing physical switch associated with an existing device (70). In effect, the master switch (101) acts to duplicate the function of the existing switch in supplying or cutting off power to the device (70), while at the same time can utilize a small amount of the power of the infrastructure (50) to which it is attached to provide additional functionality. This additional functionality generally comes in the form of two optional capabilities. The master switch (101) has the ability to receive and transmit information to other networked switches so as to act both as a control device for the attached fixture (70), and a hub on the network of switches in the system (100).

As should also be seen from the above, the electrical connection of the wires (50) to (60) is effectively one-stage removed from the toggling of any activation object (151) on the master switch (100), the computer (121) may make additional determinations or calculations prior to activating the physical switch (111). Further, the master switch (101) can obtain communication from remote switches (201) that can also serve as instructions for the computer (121) to connect or disconnect the wiring (50) to (60). The computer (121) can also provide for feedback information, such as a measure of the power consumed through the switch (101) and report that power consumption to a remote location such as a controller (301).

The above is accomplished because the computer (121) in the master switch (101) includes network capability (123) and is generally connected to other master switches (101), and anything else with network capability both in the same residence and throughout the world. In particular, the master switch (101) may be connected to any number (including zero) of remote switches (201) via a mesh network (401), to a smart device via the home network (or the Internet) (180), to a controller (301) via the Internet (or a home network) (180).

Generally, the master switch (101) will be paired with any number of remote switches (201). The remote switches (201) are designed to be simple communication nodes which serve to provide an indication of a change (e.g. when someone "flips the switch" at the remote switch (201)) to the master switch (101).

Embodiment of remote switches (201) are best shown in FIGS. 2 and 4. A remote switch (201) generally allows for the same apparent control (as viewed by a user) of a device (70) as the master switch (101), but is not directly wired into the wiring (60) for the device (70). As it is not directly connected to wiring (60), the remote switch (201) does not need to include structures to form an electrical connection, but also may not have access to hardwired power (50). Instead, the remote switch (201) is preferably powered by a compact chargeable or primary onboard power source (250) which will preferably last for a number of years, and is readily replaceable.

The onboard power source (250) is generally a DC power source which is internal to the remote switch (201). As the components of a remote switch (201) can be designed and selected to use very little power, a small battery such as "AA" or coin cell is adequate to power the remote for a number of years, depending on the cell capacity. Alternatively solar, kinetic, or other power generation systems may be used. Having no dependency on power wires (50) allows the remote switch (201) to be installed at any location. A remote switch (201) may be paired to control or work with one or more master switches (101). When the activation object (151) in the remote switch (201) is activated by touch or proximity, it sends the command signal to the computer (121) which in turns formats the message and transmits a command on a mesh network (401). The message generally contains the intended recipient master switch(es) (101) or some other form of intended address (e.g. target) information. The message can be received at the master switch(es) (101) directly from the remote switch (201) or relayed to its intended master switch(es) (101) via the mesh network (401), such as by being received and forwarded by another (untargeted) master switch (101) or by another remote switch (201).

In operation, the remote switch (201) allows for a user to add a second switch to any device (70) for which a master switch (101) can be installed. To accomplish this, the remote switch (201) will often come in two general forms. The first of these is designed to replace a light switch which was previously wired in a multi-way installation. In this instance, there is a box and wiring (50) and (60) to create the previous multi way installation. Generally, this type of remote switch (201) will be positioned over the box which previously housed the second switch in a three way configuration (with the master switch (101) located in place of the first switch). It may be connected to wiring (50) to provide for its own power instead of needing an on-board power source. However, the remote switch (201) will generally never interconnect the wiring (60) to activate the attached outlet. Instead, the wiring (50) to which it is attached will generally be solely to supply the remote switch (201) with power.

Three-way and higher multi-way switch arrangements show some of the power of the system. In a traditional three-way switch it should be recognized that there is generally a first switch connected to the power grid, and a second switch through which the wiring is connected that is connected to the device. The three-way switch works because power is communicated only if both switches are connected to the same one (of two) wires that interconnect them. With the present system (100), this is not required. In an embodiment, a master switch (101) can be connected into either switch position, and the remaining switch position may simply be hardwired to connect a particular wire either to the device (70) or electricity (50) depending on position. The hardwired box is then simply covered by the remote (201) which is not connected to anything and relies on its own internal power source. In an alternative embodiment, the remote switch may also be wired in to this line (50) to gain power, but not into line (60) to switch.

In an embodiment with a three-way switch and a wired in remote switch (201), if the master switch (101) is first (closest to the grid (50)), the remote (201) simply obtains its own power from whatever line is active (or a remote source), and connection is controlled by simply having the remote switch (201) have a connected line and a disconnected one (specifically, two lines come in, but only one can connect to an out). However when a master switch (101) is substituted for the manual switch closest to the device (70) and a remote switch is connected to power (50) at the other manual switch, the power availability and control may be different.

To provide power to the master switch (101), the master switch (101) may be configured to take power from whichever line is able to provide power. This also allows the master switch to know the position of the prior remote switch(es) (201) prior to it in the chain by sensing which input line (e.g. red or black) has power and react appropriately. The key here is that the master switch (101) knows which lines are powered and which lines are not and can act appropriately on commands it receives from the network (401). Thus, should an existing manual switch be toggled, and that the manual switch be at a position that the connected outlet is actually toggled due to power being connected or disconnected, the master switch (101) can simply update its internal memory to know that the status of the network has changed. Thus, when an instruction to toggle is received at the master switch (101), it knows how to implement the requested toggle (or other change).

Remote switches (201) connected to the same hybrid arrangement (where there is a master switch interconnected as part of a multi-way system with existing physical switches) simply act to toggle the state of the switch from whatever it is, to a different state by sending an instruction to the master switch (101) to change the state. It should also be apparent from the above that it is possible to place a master switch (101) in a three-way (or higher way) configuration while leaving the existing (non-remote switch (201)) manual switch in the line. The existing switch can function to toggle the outlet in this configuration by having the master switch (101) detect that the position of the existing switch has been changed (e.g. based on which input to the master switch (101) is energized) and having the master switch (101) toggle the power to the device (70) based on the detected change, or by allowing the toggling of the manual switch to actually toggle the outlet, and for the master switch (101) to detect the change and simply update its understanding of the arrangement of the configuration.

In a still further embodiment, the remote switch (201) can be located at a position where a switch has never previously been. In this case, the remote switch (201) will generally be designed to emulate a light switch and faceplate (141) but will be attachable to a flat wall or other surface and will not require the box built into the wall to house electronics. This is the type of embodiment shown in FIG. 2. While this type of arrangement is generally preferred, it should be immediately apparent that it is by no means required. The remote switch (201) can take any form because the remote switch (201) is not tied to the electrical wiring (60) directly controlling the device (70) and only optionally attached to the electrical grid (50).

Regardless of type or position, the remote switch (201) will generally work in a master/slave type of relationship with regards to the master switch (101). In particular, when the user determines that they want to have an additional switch to control a particular feature, the user will pair a remote switch (201) to a particular master switch (101) (or multiple master switches (101)). This may occur through a variety of techniques but will often occur through an arrangement such as having the master switch (101) know that it is to accept messages from the remote switch (201) with a particular address. The connection will generally be via the same mesh network (401) that the master switch (101) is connected to.

Thus, a user can have a lighting fixture which is located in a first location and which, prior to installation of an embodiment of the present system, has a single switch controlling its operation. The user can then replace the existing mechanical switch with a master switch (101). This master switch (101) acts as a central control hub for that fixture and will serve to control electrical flow to that fixture. The user can then tie any number of remote switches (201) (which are self-contained and do not need to interconnect with the electrical system (60) or (50)) to the operation of the master switch (101). The user can then mount these remote switches (201) wherever they please. Thus, a user could have a single outdoor light connected to a single outlet with the electrical system (50) in the garage that can now be operated by the master switch (101) (replacing the prior mechanical switch in the outlet) in the garage, or by any number of remote switches (201) that may be anywhere in the house. In an embodiment, such a remote switch (201) may include an adhesive back or other attachment known to those of ordinary skill to mount it to a wall or other convenient place.

Alternatively, if the user has a hallway light with an existing physical switch at both ends of the hallway, the user may connect a master switch (101) in place of one of the switches and then replace the other switch with a remote switch (201) which is designed to "cover" the box (401) that is no longer needed. This provides for identical functionality. However, the wire interconnecting the two prior switches in a standard three way electrical arrangement may no longer needed and may be removed from the electrical infrastructure, in an embodiment. Still further, one switch in a multi-way switch setup may be removed and a master switch (101) positioned in place thereof. The master switch (101) can then use electrical inputs based on the toggling of other switches in the chain to determine if the outlet should be toggled from a current position or to simply detect that the other switches have changed configuration and update its understanding of the arraignment to allow it to correctly toggle should it receive a command in the future.

As should be apparent, while the use of remote switches (201) is particularly favorable as it allows for a traditional "light switch" to be provided essentially anywhere so long as both the master (101) and remote switch (201) can communicate over the network. The master switch (101) can act as a hub for the network (401) of instructions from any remote switch (201), and can also act as a hub to communicate instructions to or from any other master switch (101). This allows for a mesh network (401) to be created where any switch (master (101) or remote (201)) associated with the network can communicate with the mesh network (401) simply by interacting with the nearest other connected object in the network (401). This can provide for power savings as it is possible to operate the network with a minimum of power.

Further, by having an interconnected mesh of objects, the network (401) of interconnected controllers is not limited to switches (101) or (201). Specifically, one or more of the master switches (101) can connect to further network infrastructure. For example, one or more of the master switches (101) may be capable of connecting to an existing home wired or wireless network (180) which is then connected externally to the Internet. Thus, in addition to switches (101) and (201) there may be provided a controller (301) which is actually a computer (particularly a mobile computer) which is capable of providing control of any master switch (101) associated with the system (100). The controller (301) can also be operated from anywhere where an Internet connection can be obtained. Thus, the single light fixture which originally had a single mechanical switch, can now be operated from the master switch (101) (which has replaced that mechanical switch), from any remote switch (201) communicating with that master switch located anywhere in the facility, from any controller (301) which can communicate via a network with any of the remote (201) or master switches (101) located anywhere the Internet is accessible, or from any other thing which is capable of sending an instruction onto the network (401) or (180) which can be understood by the master switch (101) as an instruction to control an attached device (70). This can include a remote smart device. Further, as any remote switch (201) can actually be setup to control any number of master switches (101), the system (100) has a near infinite number of possible configurations and control options.

An embodiment of the system (100) is shown in a representative configuration in FIG. 5. As should be apparent, there are a plethora of configuration opportunities as the system (100) is constructed with numerous master (101) and remote switches (201). Generally, every switch (101) or (201) or device (70) has a communication connection (generally via a master switch (101), although a smart device may utilize its onboard communication) to at least one other object in the system (100). The network is self-organizing, and broadly configurable. The system (100) in FIG. 5 only shows 4 master switches (101), 4 remote switches (201) and two controllers (301), but this is only representative. Each master switch (101) has an associated electrical connector (60) to a device (70) (load) which is activated either on or off (or partially on or off, in such cases as the need for dimming). L1A (70) can only be powered by master switch (101). However, the physical switch (111) in the MS1 (101) itself can be commanded locally from its own activation object (151), or can be controlled from the FR1 remote switch (201) or can be controlled by either controller (301). It is possible to control more than one master switch (101) with a single remote, and it is additionally possible to control one master switch (101) with multiple remote switches (201) in accordance with a user configuration. This configurability illustrates one of the unique features of this embodiment.

The backbone of the communication system formed in the network (401), in an embodiment such as FIG. 5, is Bluetooth Low Energy (BLE) technology. Because it is a low energy solution, it has a transmission range that is geographically short. In order to reach and control the system from afar, the capability to send messages via the Internet (180) to a hub (80) is provided. The Wi-Fi signal is interpreted and converted to corresponding BLE signals at hub (80). This provides that the system (100) can be controlled and interrogated from afar while still allowing power saving from use of BLE.

As indicated previously, FIG. 1 is a purely hypothetical configuration, consisting of 4 master switches (101), each controlling one or more devices/loads (70). All master switches (101) can be controlled/operated by their own activation indicator (141). To show flexibility, two master switches (201) paired switches (101) in this embodiment are shown controlled by one remote switch (201). A different master switch (101) has no remote, and a still further master switch (101) has two remote switches (201) that can also control its operation. It should be noted that the second remote, R2B is illustrated as being unable to communicate directly to its master MS2. Its message is routed through the network via MS3 to its ultimate destination at MS2. The network can be addressed/controlled by any controller (301) that has a Bluetooth Low Energy communication capability. For control at greater ranges, any controller (301) can communicate to a local hub (80) that can convert the WiFi message and re transmit the appropriate low energy Bluetooth message to the system (100).

In an embodiment, the system (100) is able to measure and pass the field strength of each transmission. With this calculation, it is possible to triangulate the location of master switches (101) and remote switches (201) and in fact any other Low Energy Bluetooth transmitter. It is therefore possible to locate and map devices relative to each other and some set reference point. In addition, as each switch (101) or (201) may indicate the transmission source, it becomes possible to delineate master switches (101) from remote switches (201) from controllers (301) from anything else connecting to the network (401). In a similar manner, any user carrying a Low Energy Bluetooth transmitter of any kind on their person is able to be located within the network. Anyone that is in the field and causes a change in field strength again because of their location can be located by the network, allowing the network to become an occupancy sensor within a building or a house without the need to utilize specific motion sensors.

The flexibility and power of the system (100) should be apparent from the above. By providing a single master switch (101) which effectively controls power to a single terminus point (outlet) in the infrastructure, the system (100) can allow for automation and remote control of any electrical device (70) connected to the infrastructure. Further, it can control each and every device (70) independently of control of any other, providing for full customization and flexibility. The inclusion of the controller (301) then allows for the master switches (101) to be programmed with automation instructions to provide not just for remote control but for automation. This can allow a user to program time schedules, generate a map of locations of switches, program automatic communications or object detector functions, to implement "safe modes" (as discussed later) and related global controls, or other command level functions.

A controller (such as, but not limited to, general purpose computer, mobile device, or specialized computer) (301) can act to control any or all of the switches (101) and (201) and/or change between them. The controller (301) is effectively simply a remote switch (201) which can address itself to any master switch (101) upon command and may have access to more powerful communication methods to enable it communicate with the system from a location outside of direct communication range. In an embodiment, the controller (301) can connect to the Internet (180), which in turn can connect to the mesh network (401).

To illustrate how automation, and not just remote control, can occur, it can be best to provide for a single example. In this example, a user's alarm clock goes off. The alarm clock is actually a remote switch (201) which also includes functionality of a clock. When the user hits the shut off button on the clock, this is directed to a master switch (101) and eventually a controller (301). The controller (301) looks up and sees that it is a weekday and the user is supposed to get up when the alarm clock is shut off. To do so, the controller (301) instructs a master switch (101) to supply power to powered window shades in the master bedroom opening the shades. The controller (301) also instructs a master switch (101) for a plug outlet in the kitchen to turn on (into which a coffee machine is plugged in). As the user sits up in bed, a motion detector of a remote switch (201) on a nearby wall detects the motion, and begins to activate the lights in the room, using a slow fade on to allow the user's eyes to adjust via a master switch (101) located across the room from itself. As the user shuffles out to the kitchen to get their coffee, a motion sensor in a master switch (101) in the living room senses them approaching and turns on the lights. The above provides that the user has now opened the shades, turned on the lights, and started coffee brewing by doing nothing other than shutting off the alarm clock and getting out of bed.

As contemplated in the above example, the user can effectively interact with their electrical devices (70) without need to consciously interact with them, or to interact with them only in a minimalist way. Further, the system (100) preferably also provides a network to provide local alerts as regards instances such as malfunction of the load and has the ability to operate automatically as on timed schedules. The system (100) can have the ability to automatically sense the presence or absence of individuals (e.g. through the use of motion sensors at any of the master (101) or remote switches (201) or by the user carrying a BLE capable device into an area and altering field strength), and react in a preplanned manner. In order to facilitate intercommunication occurring in a logical fashion, the system (100) may automatically generate a map of the communication devices (remote switches (201), master switches (101), or controller (301) or anything else), establish their physical location, and react to input from them in a manner based on that location. In this way, an instruction from a controller (301) such as a smart phone that the user will usually carry with them to "turn on the lights" will turn on the lights in whatever room the controller (301) is currently located. In an embodiment, a user may carry a locator in the form of a transmitter. This may be on their person, in something they commonly carry, or even implanted The system (100) can then be controlled via instructions preprogrammed into a computer on the network (401) to do certain things, based on the location of this transmitter.

In an embodiment, as illustrated in the example, the system (100) facilitates not only the simple "on and off" (binary) power to devices (70), but also facilitates changing or modifying the primary power so that such items as incandescent, CFL, and LED lights can be dimmed or devices such as fans slowed. It could also directly supply DC instead of AC power to the wire (60) depending on the device (70) connected. As the master switch (101) ultimately has control of electrical power (50) to each outlet, the master switch (101) can provide that power in any fashion in the same manner as any traditional switch or controller. An embodiment of the system (100) provides for the ability of all system functions to be controlled at greater remote distances through the Internet via the controller (301). In this way, the entire electrical system of the facility (and all associated devices) can be controlled remotely with a single controller (301) so long as the controller (301) is capable of connecting to the network and transmitting appropriate instructions. To facilitate this connection, the system (100) may utilize traditional networking infrastructure (wired or wireless) which may be present in the structure to allow for at least one master switch (101), or possibly a collocated controller (301), to interconnect with the Internet or any other large scale network and the mesh network of the system (100).

It should also be apparent that in addition to providing switching capability associated with using an attached device (70) in a standard fashion, the system also provides a unique capability for safety by allowing a clear "power off" status. Traditionally, a person changing a light bulb or otherwise working on a fixture which was connected to multiple hardware switches had no way of being certain if the power was actually disconnected to the fixture without cutting power to the area of the structure as a whole (e.g. through a circuit breaker). In the present system (100), because there is only one physical (131) switch which has actual control over the power supply to any fixture, and that switch's (131) on/off status is not dictated by all physical switches connected thereto (but can be controlled by any controller (301) or similar device), the system (100) can engage a safe mode whereby a user indicates that power needs to be cut to a particular outlet (and generally not reengaged) until certain situations have been met. The system (100) can then determine whether there is live power on the load (70) and if so disconnects the power (50) to the load (70) until the safety has been disengaged. This can allow a user to safely work on an outlet with certainty there is no power flowing to it.

Similarly to the above, a parent can completely shut off power to an outlet in a child's room or at a lower point in a structure to reduce or eliminate the possibility of a shock event from a child playing with the outlet, but can utilize a protected controller (301) (e.g., a computer protected by a password for operation), or a retrofitted (generally, remote (201)) switch located where the child cannot reach, to re-enable power should the adult need it in the room. As should be apparent, the system provides for improved safety because the mechanical connection of any outlet or fixture is generally controlled by a single switch and the status of that switch is known due to the network interconnection. Thus, a user can effectively control power to any outlet independently of any other, and can definitively shut off power to any outlet without need to throw a circuit breaker.

It should be apparent from the above that the system (100) provides, via the associated master switch (101), a single point of control for the electricity flowing to any outlet and thus the attached device. Further, the master switch (201), through interconnectivity to remote switches (201) and controllers (301), allows for itself to be controlled in virtually any configuration desired by any controller (301) connected to it via the network (401) or (180).

It should be apparent that the system (100) provides for a virtually limitless number of potential configurations of components. In a fully integrated home automation system, every access point (outlet) in the electrical infrastructure of the home will have a master switch (101) associated therewith. Further, each master switch (101) may have any number of remote switches (201) associated therewith. With just this much infrastructure, a homeowner could control essentially any device (70) anywhere in the house from a switch they placed anywhere they desired without the need to install any wiring or any network infrastructure other than the switches themselves, which are either connected to existing electrical infrastructure in a simple manner corresponding to the installation of a traditional light switch or plug outlet, or are simply placed where desired. A user could simply place a switch on a bedside table which could instruct an outside light on the opposite side of the house (or any other device in the home).

It should also be apparent from the above that the switching system (100) in an embodiment, can consume minimal power and operate quiescently in a sleep mode to allow the system (100) to provide energy saving capability without it having to consume additional electricity to do so. Ideally, master switches (101) would also be able to measure and report power consumed through the master switch (101) (and, thus, any attached device (70)) and report that power consumption to a remote location to allow for effective electrical use monitoring and minimization.

In an embodiment, the system (100) can provide for fault protection. For example, should the system (100) detect a fault in activation. For example, if a certain master switch (101) activates, but a load is not detected from a device (70), as would be the case if the device (70) had failed to activate upon being provided with power, the master switch (101) could detect that this has occurred and send out a communication via network (401) or (180) to notify a user (such as via controller (301) or via another mobile device) that the fault has occurred. If the communication goes via controller (301), in an embodiment, the system (100) could then request input from the user via the controller (301) as to how to react to the fault.

The network (401) or (180) can also provide local alerts as regards instances such as in operation of the load and to allow the system to operate automatically and on timed schedules, automatically sense the presence or absence of individuals, and react in a preplanned manner. In many respects, for the switches to be able to not only operate within, but to control a home automation system. The system can automatically generate a map of the switches in the network and their physical location in a manner that allows each switch to interact with others based on expected proximity. For example, if a person is moving through a structure, it can be desirable for the system to know what switches exist along a proposed pathway and to extrapolate the operation of other switches based on this. Further, the system could preferably know that another switch is in the same room as itself, and therefore the switches are likely intended to work to common purpose. There exists a need for a system that not only switches the load on and off but also facilitates changing the primary power so that such items as incandescent, CFL, and LED lights can be dimmed or fans slowed and can allow the switches to operate in a non-binary manner.

While the invention has been disclosed in connection with certain preferred embodiments, this should not be taken as a limitation to all of the provided details. Modifications and variations of the described embodiments may be made without departing from the spirit and scope of the invention, and other embodiments should be understood to be encompassed in the present disclosure as would be understood by those of ordinary skill in the art.

The invention claimed is:

1. A power control system for retrofitting into a structure, the system comprising:
   a master switch comprising:
   a first activation object;
   a physical switch;
   a first computer configured to control said physical switch; and
   a first network communication system configured to receive instructions from a network and provide them to said first computer;
   wherein said first computer will adjust a configuration of said physical switch upon receipt of an instruction from said first network communication system or activation of said first activation object; and
   a controller, the controller comprising:
   a second computer including software instructions for receiving an indicator of an activation; and
   a second network communication system configured to provide instructions to said network;
   wherein upon said second computer receiving an indicator of activation said second network communication system will instruct said first computer via said network to control said physical switch.

2. The power control system of claim 1, wherein said physical switch is an SPDT relay.

3. The power control system of claim 1, further comprising an analog control circuit for providing instructions from said first computer to said physical switch.

4. The power control system of claim 1, wherein said network is a Bluetooth Low Energy network.

5. The power control system of claim 1, wherein said first activation object is a capacitive touch plate.

6. The power control system of claim 1, wherein said instruction includes:
   an address of said network; and
   an identifier of said master switch to which said instruction is directed.

7. The power control system of claim 6, wherein said instruction also includes a security code.

8. The power control system of claim 7, wherein said security code is an RSA code.

9. The power control system of claim 1, wherein said network is a self-organizing network.

10. The power control system of claim 9, wherein said first computer can act as a hub in said self-organizing network.

11. The power control system of claim 1 wherein said second network communication system is connected to said network via the Internet.

12. The power control system of claim 1 wherein said controller is a mobile device.

13. The power control system of claim 1 wherein said software instructions include instructions for activating said physical switch according to a timetable.

14. The power control system of claim 1 wherein said software instructions include instructions for disconnecting said physical switch regardless of activation of said first activation object.

15. The system of claim 1 wherein said master switch is configured to replace a traditional lightswitch.

16. The system of claim 1 wherein said master switch is configured to replace a plug outlet.

17. The system of claim 1 wherein said software instructions include instructions for displaying on said mobile device a simulated switch and said indicator of activation is a user simulating toggling of said simulated switch.

18. The system of claim 1 wherein said first computer adjusts said configuration of said physical switch to connect or disconnect to a power source.

19. The system of claim 1 wherein said first computer adjusts said configuration of said physical switch to reduce or increase power draw from a power source.

20. The system of claim 1 wherein said first activation object is disconnected from said physical switch.

\* \* \* \* \*